United States Patent [19]

Miner

[11] 4,021,877

[45] May 10, 1977

[54] BRUSH ASSEMBLY FOR VEHICLE WASH APPARATUS

[75] Inventor: Earl L. Miner, Long Lane, Mo.

[73] Assignee: Detroit Tool & Engineering Co., Lebanon, Mo.

[22] Filed: June 27, 1975

[21] Appl. No.: 591,091

[52] U.S. Cl. .............................. 15/53 A; 15/DIG. 2
[51] Int. Cl.² .......................................... B60S 3/06
[58] Field of Search ......... 15/DIG. 2, 53 A, 53 AB, 15/97 B, 49 R, 50 R, 82, 179–183

[56] References Cited

UNITED STATES PATENTS

| 1,867,728 | 7/1932 | Card, Jr. ........................ | 15/179 X |
| 3,403,417 | 10/1968 | Hanna et al. ..................... | 15/53 AB |
| 3,921,242 | 11/1975 | Clark ............................. | 15/53 AB |

FOREIGN PATENTS OR APPLICATIONS

| 1,936,889 | 1/1971 | Germany ........................ | 15/DIG. 2 |
| 1,945,741 | 3/1971 | Germany ........................ | 15/DIG. 2 |
| 2,028,157 | 12/1971 | Germany ........................ | 15/DIG. 2 |

*Primary Examiner*—Edward L. Roberts
*Attorney, Agent, or Firm*—Cohn, Powell & Hind

[57] ABSTRACT

This vehicle washing apparatus includes a pair of side brush assemblies mounted to a gantry, each brush assembly including a shaft carrying upper and lower rotary brush units. The lower brush unit of each assembly is fixedly mounted to its shaft for rotation with the shaft while the upper brush unit is mounted for rotation relative to said shaft by virtue of an adjustable clutch connection between the upper brush unit and the shaft so that said upper unit is subject to slippage when the brush engages a projection on the side of the vehicle. The shaft includes a jointed lower portion carrying an actuating finger which operates a switch to reverse direction of shaft rotation when the lower portion is tilted out of vertical alignment.

12 Claims, 7 Drawing Figures

BRUSH ASSEMBLY FOR VEHICLE WASH APPARATUS

BACKGROUND OF THE INVENTION

This invention relates to an apparatus for washing a vehicle and particularly to a gantry having side brush assemblies each including relatively rotatable upper and lower brush units.

The problem of preventing side brush assemblies from exerting force against projections on an automobile such as antennas and driving mirrors during the washing cycle is particularly vexing. Conventional side brushes are commonly formed of flexible strips which aggravate the problem by being susceptible to tangling with such projecting obstacles resulting in the possibility of costly damage to the vehicle and the brushes.

This problem has been solved by the present device in a unique manner not disclosed in the known prior art.

SUMMARY OF THE INVENTION

It is an important object of this invention to provide a vehicle wash system which includes a gantry having side brush assemblies that can effectively wash a vehicle without tending to damage or catch on projecting portions of the vehicle such as mirrors and antennas.

It is another object to overcome this problem, without reducing the force necessary at the lower portion of the brush assemblies to wash the lower portions of the vehicle, by providing independently movable upper and lower brush units.

It is an object of this invention to provide a brush assembly for a vehicle washing apparatus which comprises an elongate shaft having first and second rotary brush means mounted thereto engageable with the vehicle, the first rotary brush means being fixedly mounted to the shaft, the second rotary brush means being mounted for rotation relative to the shaft by virtue of clutch means between the shaft and the second brush means, the clutch means having a predetermined slip resistance responding to the engagement between said second brush means and the vehicle, the engagement providing the torsional force tending to overcome the clutch resistance.

It is another object to provide a clutch means which includes resilient means urging said second brush means and said shaft into pressure engagement and to provide said clutch means with adjustment means to adjust the predetermined slip resistance.

Still another object is to provide both the shaft and the clutch means with spaced bearing means and to provide a clutch plate, engageable with one of said bearing means, and a spring, operatively engageable with said clutch plate and the other bearing means.

Yet another object is to provide that one of said bearing means is lengthwise adjustable to change the length of the spring and therefore the pressure on the clutch plate.

It is an important object of this invention to provide an apparatus for washing a vehicle said apparatus including a gantry, which is movable relative to the vehicle being washed and includes oppositely moving carriages each of said carriages including a depending brush assembly of the character described.

Yet another object is to provide each of said brush assemblies with a jointed shaft whereby said lower shaft portion can be angled and to provide an actuating arm operatively attached to said lower shaft portion which actuates a brush reversing means as when said lower shaft portion is angled relative to the upper portion upon engagement with a vehicle.

It is an object of this invention to provide a side brush construction that is relatively simple and inexpensive to manufacture and extremely efficient in operation.

DESCRIPTION OF THE PREFERRED EMBODIMENT

Figure 2:
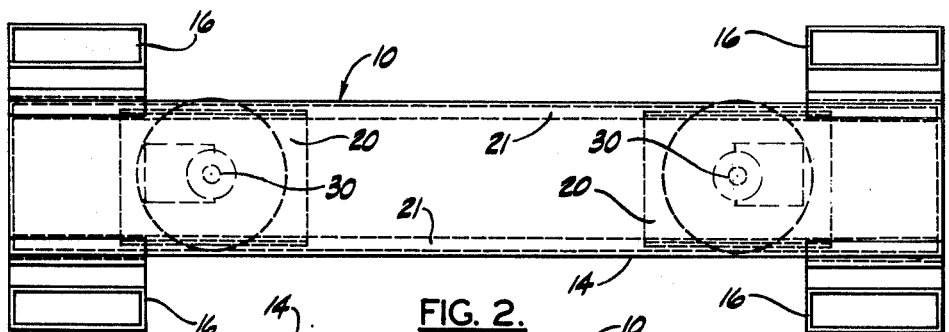
FIG. 2 is a plan view of the gantry.
Figure 1:
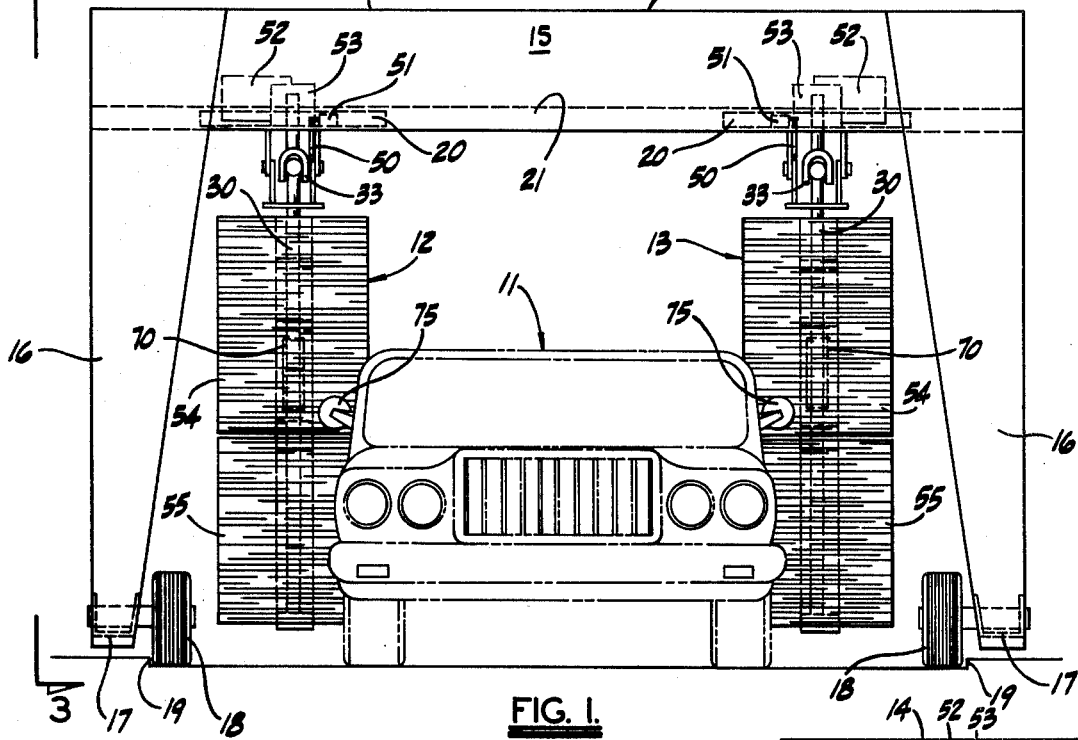
FIG. 1 is a front elevational view of the vehicle wash gantry.
Figure 3:
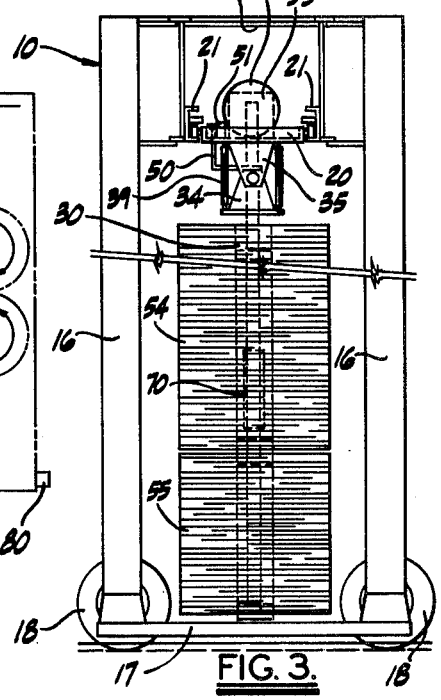
FIG. 3 is a cross sectional view taken on line 3—3 of FIG. 1.

Referring now by characters of reference to the drawing and first to FIGS. 1, 2 and 3 it will be understood that the vehicle wash apparatus disclosed provides a gantry 10 which is longitudinally movable relative to the vehicle 11 and includes side brush assemblies generally indicated by numerals 12 and 13. The side brush assemblies are used in conjunction with an overhead brush assembly (not shown).

More specifically, the gantry 10 includes an overhead bridge member 14 formed from side plates 15 and having post members 16 at either end interconnected at the low end by a cross member 17. The side brush assemblies 12 and 13 are longitudinally movable with the gantry 10 and are also mounted for movement lengthwise of the bridge member 14. Said assemblies are in mirror image of each other but are otherwise substantially identical in structure. These assemblies will therefore be described with respect to assembly 12.

Figures 5, 6, 7:
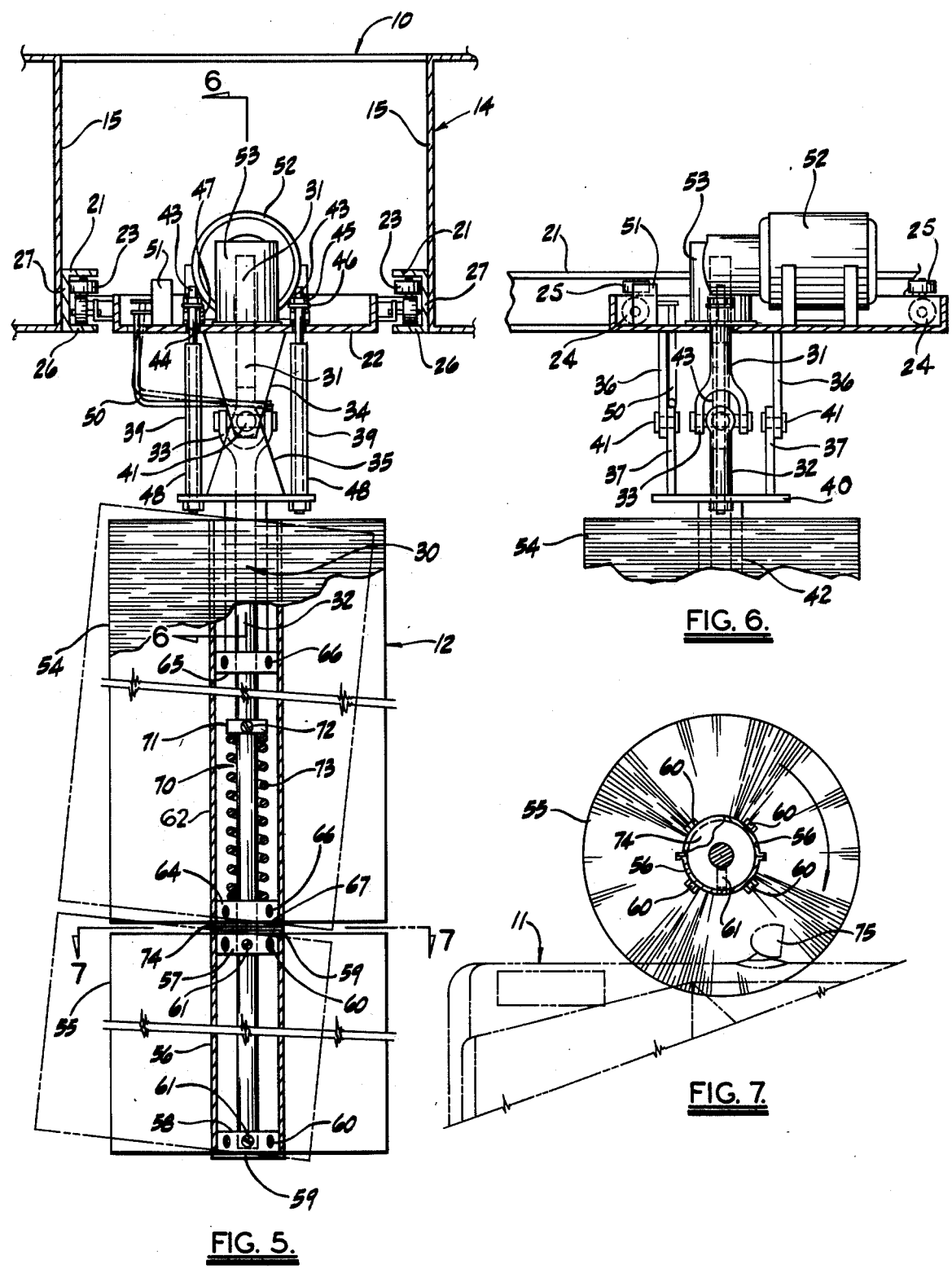
FIG. 5 is an enlarged fragmentary view of the brush assembly broken away to illustrate the clutch assembly.
FIG. 6 is a fragmentary cross sectional view taken on line 6—6 of FIG. 5.
FIG. 7 is a cross sectional view taken on line 7—7 of FIG. 5.

As shown in FIGS. 5 and 6 particularly, the side brush assembly 12 is mounted in depending relation to a carriage 20 which is movable in channel-shaped tracks 21 provided on each side of the bridge side plates 15. The carriage 20 includes a base portion 22 provided with fore and aft wheel assemblies mounted thereto and generally indicated by numeral 23, each wheel assembly consisting of vertical and horizontal components 24 and 25 engageable with the flange 26 and web 27 respectively of the track 21. The carriages 20 and therefore the brush assemblies 12 and 13 are oppositely movable toward and away from the center of the bridge member 14.

A shaft assembly generally indicated by numeral 30 is mounted in rotatable relation to the carriage base 22. The shaft assembly 30 which constitutes a shaft means includes an upper shaft 31 and a lower shaft 32 interconnected by a universal joint 33, which permits the normally axially aligned shafts 31 and 32 to be angled relative to each other so that the lower shaft 32 can be tilted out of vertical alignment. The joint 33 includes pivotally related brackets 34 and 35 which permit the upper and lower shafts 31 and 32 to be tilted out of vertical alignment in the direction of longitudinal travel only. The upper bracket 34 is provided by a pair of spaced side plates 36 attached to the underside of the base 22, as by welding, and the lower bracket 35 is provided by a pair of spaced side plates 37 interconnected by a bottom plate 40 as by welding.

The upper and lower brackets 34 and 35 are pivotally connected by pins 41 having a coincident horizontal axis in the same plane as the center of the universal joint 33. The bottom plate 40 is provided with a sleeve 42, attached as by welding to the underside of said plate, which receives the lower shaft 32 in rotatable relation. The shaft assembly 30 is resiliently mounted to the carriage 20 by means of a spring assembly 39 constituting a resilient means and consisting of a pair of elongate bolt members 43 extending upwardly from the bottom plate 40 and projecting through the carriage base 22 which is apertured at 44 to receive the bolts 43. Each bolt 43 is provided with a nut and washer 45 and 46; a compression spring 47, which extends between the washer 46 and the carriage base 22, and a sleeve 48. It will be understood that the springs are compressed when the lower shaft 32 is moved out of longitudinal alignment, as for example when it engages a vehicle in its path, and that said springs tend to urge said shaft 32 into realignment. The sleeves 48 provide a stop means limiting upward movement of the bolt.

Importantly, an ell-shaped actuator arm 50 is welded to the lower bracket 37 which moves with the lower shaft 32. The actuator 50 constitutes an actuator means and operates a limit switch 51 which controls a motor 52. The motor 52 is connected to a transmission 53 which drives the upper shaft 31 and hence, through the medium of the universal joint 33, the lower shaft 32, thereby providing the drive means for the side brush assemblies — which will now be described.

The lower shaft 32 carries both a lower brush unit 55 which is directly driven by said shaft 32 and an upper brush unit 54 which is indirectly driven by said shaft 32 by virtue of a clutch connection. More specifically, the lower brush unit 55, which constitutes a first rotary brush means, includes a pair of semi-cylindrical hollow core members 56 which are attached in fixed relation to support collars 57 and 58, spaced lengthwise along the shaft 32, as by fasteners 60 and each collar is provided with a seating flange 59 to facilitate attachment of the core member 56. The collars 57 and 58 are fixedly attached to the shaft 32 as by set-screws 61 and thus the lower brush unit 55 rotates with said shaft.

The upper brush unit 54, which constitutes a second rotary brush means, includes a pair of semi-cylindrical core members 62, which are attached in fixed relation to support collars 64 and 65 spaced lengthwise along the shaft 32, as by fasteners 66. Collar 64 is provided with a seating flange 67 similar to flange 59 provided on the lower brush unit collar 57. However, neither of the upper brush unit collars 64 or 65 is attached directly to shaft 32. The operative attachment of the upper brush unit 54 to said shaft 32 is through the medium of an adjustable friction clutch assembly, generally indicated by numeral 70, which will now be described with particularity.

The clutch assembly 70 provides a clutch means whereby the upper brush unit 54 can be rotated relative to the lower brush unit 55, and to this end includes a bearing collar 71, which constitutes a clutch bearing means and which is lengthwise adjustably attached to the shaft 32 by means of a set screw 72; a compression spring 73, which extends between the underside of bearing collar 71 and the upper side of the support collar 64, and a clutch friction plate 74 of the plastic material known as Teflon or similar clutch material. The clutch friction plate is seated on the collar 57, which provides a bearing means operatively attached to the shaft means. The location of the bearing collar 71 determines the length of the spring 73 and hence the compression force urging the upper brush unit 54 into engagement with the collar 64 and hence against the clutch plate 74. When the spring 72 is not compressed only the weight of the upper brush unit 54 exerts a pressure on clutch plate 74 and the upper brush unit 54 can thereby readily be rotated relative to the shaft 32 when the brush unit meets an obstacle, such as the driving mirror 75 on the automobile 11. Stated another way, the upper brush unit 54 which, without the presence of an obstacle would normally rotate with the shaft 32, is halted when it meets an obstacle producing sufficient torque resistance.

Because of the pressure adjustment of the spring 73, the amount of torsion required to halt the upper unit 54 can be predetermined. Thus, pressure adjustment can be readily made to suit particular conditions as desired.

It is thought that the structural and functional advantages of the brush assembly have become clear from the foregoing description of parts. However, for completeness of disclosure the operation of the gantry with particular reference to the side brush action will be briefly described with reference to FIG. 4.

The gantry 10 is shown in an initial position in the schematic in full lines. The vehicle 11 is stationary at all times in the center of the bay. Following actuation of the gantry 10 by an operator, the side brush assemblies 12 and 13, which are initially disposed away from the center of the bay, transverse to the center of the bay rotating in opposite directions. When they reach the center a limit switch (not shown) is closed and the gantry 10 starts toward the vehicle 11, being guided as by engagement between ground wheels 18 with associated shoulders 19. The brush assemblies 12 and 13 engage the front of the stationary vehicle 11, which causes the lower shaft 32 to tilt out of alignment with the upper shaft 31 and stop the gantry 10 when the tilt limit is reached, such limit being controlled by the spring assembly 39. The tilting of the lower shaft 32 moves the actuator arm 50 (FIG. 5) upwardly to close the limit switch 51. This reverses the rotation of the brush assemblies 12 and 13, and causes them to move away from the center of the bay. At the end of this outward travel the brush assemblies 12 and 13 close a limit switch (not shown) and the gantry 10 again starts down the bay and the brush assemblies return to engage the sides of the vehicle.

Figure 4:
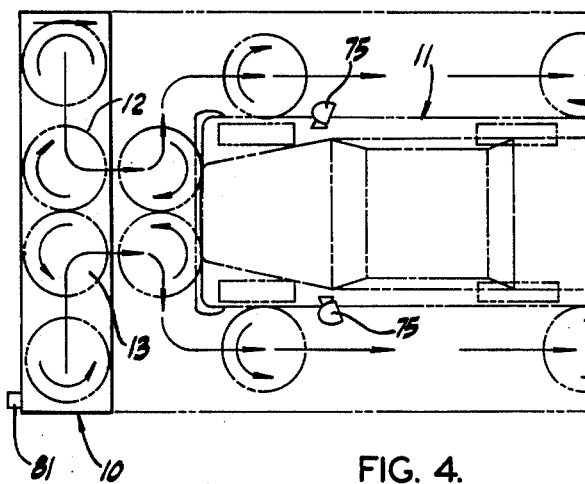
FIG. 4 is a schematic illustrating the movement of the side brushes of the gantry.

Because of the clutch connection between the lower shaft 32 and the upper brush unit 54 any obstacle in the form of a projecting object, such as an antenna or driving mirror (FIG. 7), which engages the upper brush unit 54 stops or inhibits rotation of the brush unit and prevents the object from being damaged. At the rear of the vehicle the side brush assemblies 12 and 13 again traverse to the center of the bay the gantry 10 continues until it engages an end stop 80. This engagement actuates a limit switch (not shown) which reverses direction of said gantry 10. The brush assemblies, now centered, engage the rear of the vehicle 11 to actuate the arm 50 thereby reversing rotation of the said assemblies and moving them outwardly. The brush assemblies again clean the sides of the vehicle and partially re-cleans the front of the vehicle when the front end of the vehicle is reached, by moving inwardly. When the assemblies are again centered the gantry 10 moves until it engages end stop 81 to actuate a limit switch (not shown). This causes the assemblies to move away from the center of the bay and to engage an outer limit switch (not shown) which signals the unit to stop. It will be understood that, in general, the rotation of the side brushes is such that they tend to roll along the surface being cleaned. The rotation of the brushes shown in FIG. 4 is for forward movement of the gantry. The rotation is reversed for the return movement.

If at any time, to suit particular conditions, it is desired to adjust the torque resistance necessary to halt rotation of the upper brush unit 54, the location of the bearing collar 71 is adjusted lengthwise to increase or decrease the pressure on the compression spring 73.

I claim as my invention:

1. A brush assembly for a vehicle washing apparatus, the brush assembly comprising:
    a. shaft means,
    b. a first rotary brush means fixedly mounted to the shaft means for rotation with said shaft means, said first brush means being engageable with the vehicle,
    c. a second rotary brush means mounted to the shaft means in endwise relation to the first rotary brush means for rotation relative to said shaft means, said second brush means being engageable with the vehicle,
    d. clutch means operatively disposed between the shaft means and the second brush means and having a predetermined slip resistance, the engagement between the second brush means and the vehicle providing the torsional force tending to overcome the clutch resistance to cause said relative rotation between said second brush means and said shaft means,
    e. said clutch means including resilient means operatively disposed between the shaft means and the second brush means urging said second brush means and said shaft means into engagement.

2. In an apparatus for washing a vehicle:
    a. support means movable relative to the vehicle,
    b. shaft means mounted to the support means for rotation relative to the support means,
    c. a first rotary brush means fixedly mounted to the shaft means for rotation with said shaft means, said first brush means being engageable with the vehicle,
    d. a second rotary brush means mounted to the shaft means in endwise relation to the first rotary brush means for rotation relative to said shaft means, said second brush means being engageable with the vehicle,
    e. clutch means operatively disposed between the shaft means and the second brush means and having a predetermined slip resistance, the engagement between the second brush means and the vehicle providing the torsional force tending to overcome the clutch resistance to cause said relative rotation between said second brush means and said shaft means,
    f. drive means operatively rotating said shaft means, said drive means including reversing means for reversing rotation of the shaft means,
    g. said shaft means being mounted to said support means in depending relation and including upper and lower portions and joint means connecting said upper and lower portions in angling relation to each other for movement of said lower portion out of alignment with said upper portion,
    h. actuating means operatively attached to said lower shaft portion and actuating said reversing means when said lower shaft portion is angled relative to said upper portion, and
    i. resilient means operatively connected to said movable lower portion and tending to maintain axial alignment of said lower portion.

3. An apparatus for washing a vehicle as defined in claim 2, in which:
    j. said reversing means includes switch means, and
    k. said actuating means includes an arm operatively connected to said lower shaft portion and operatively engaging said switch means to actuate said switch means to reverse the direction of rotation of said shaft means when said lower shaft is angled out of alignment.

4. An apparatus for washing a vehicle as defined in claim 2, in which:
    j. said movable support means includes a gantry having a track and a carriage movably mounted to said track,
    k. said shaft upper portion is carried by said carriage and is rotatable by said drive means, and
    l. said resilient means is operatively connected between said shaft lower portion and said carriage.

5. In an apparatus for washing a vehicle:
    a. a wheeled gantry including opposed post members and an interconnecting transverse member, said gantry being longitudinally movable relative to a stationary vehicle,
    b. a pair of movable carriages mounted for transverse movement in opposite directions lengthwise of said transverse member,
    c. a drive assembly mounted to each carriage,
    d. a side brush assembly mounted to each carriage in drive relation to the drive assembly thereon, each brush assembly including:
        1. shaft means mounted in depending, rotatable relation to the carriage means, and including a bearing means,
        2. a lower, rotary brush means fixedly mounted to the shaft means for rotation with said shaft means and engagement with the vehicle,
        3. an upper, rotary brush means mounted to the shaft means in endwise relation to the lower rotary brush means for rotation relative to said shaft means and engagement with the vehicle, and
        4. clutch means disposed between the shaft means and the upper brush means, said clutch means including a bearing means spaced from said shaft bearing means, a clutch plate operatively disposed in engaging relation with one of said bearing means and the upper rotary brush means, and resilient means operatively disposed between said bearing means to exert pressure on the clutch plate, one of said bearing means being movable relative to the other bearing means to adjust the pressure to a predetermined value.

6. An apparatus for washing a vehicle as defined in claim 5, in which:
    e. each shaft means includes an upper portion, a lower portion and a joint means connecting said lower portion in angling relation to said upper portion, and f. actuating means operatively attached to said shaft means to actuate said drive assembly when said lower portion is angled.

7. An apparatus for washing a vehicle as defined in claim 6, in which:
   g. said drive assembly includes switch means, and
   h. said actuating means includes an arm operatively engageable with said switch means.

8. An apparatus for washing a vehicle as defined in claim 7, in which:
   i. each joint means includes:
      1. a universal joint between said shaft portions,
      2. an upper bracket fixedly attached to said carriage, and
      3. a lower bracket pivotally attached to said upper bracket and including journal mounting means for said lower shaft portion.

9. An apparatus for washing a vehicle as defined in claim 8, in which:
   j. each lower bracket includes resilient means operatively engageable with said carriage means and tending to maintain axial alignment between said shaft portions.

10. A brush assembly for a vehicle washing apparatus, the brush assembly comprising:
    a. shaft means
    b. a first rotary brush means fixedly mounted to the shaft means for rotation with said shaft means, said first brush means being engageable with the vehicle,
    c. a second rotary brush means mounted to the shaft means in endwise relation to the first rotary brush means for rotation relative to said shaft means, said second brush means being engageable with the vehicle,
    d. clutch means operatively disposed between the shaft means and the second brush means and having a predetermined slip resistance, the engagement between the second brush means and the vehicle providing the torsional force tending to overcome the clutch resistance to cause said relative rotation between said second brush means and said shaft means,
    e. said clutch means including bearing means, a clutch plate operatively engageable with said second rotary brush means and a spring operatively disposed between said bearing means and said second rotary brush means to apply pressure to said clutch plate.

11. A brush assembly as defined in claim 10, in which:
    f. said shaft means includes a bearing means spaced from said clutch bearing means,
    g. said spring is disposed between said shaft bearing means and clutch bearing means, and
    h. one of said bearing means is lengthwise adjustable to change the length of the spring and thereby the pressure on the clutch plate.

12. A brush assembly for a vehicle washing apparatus, the brush assembly comprising:
    a. shaft means,
    b. a rotary brush means mounted to the shaft means for rotation relative to said shaft means, said brush means being engageable with the vehicle,
    c. clutch means operatively disposed between the shaft means and said brush means and having a predetermined slip resistance, the engagement between the brush means and the vehicle providing the torsional force tending to overcome the clutch resistance to cause said relative rotation between said brush means and said shaft means,
    d. said clutch means including resilient means yieldable lengthwise of the shaft means and operatively disposed between the shaft means and said brush means urging said brush means and said shaft means into engagement.

* * * * *